(12) United States Patent
Kikuchi et al.

(10) Patent No.: US 12,381,397 B2
(45) Date of Patent: Aug. 5, 2025

(54) POWER CONVERSION SYSTEM AND CONTROL DEVICE FOR SAME

(71) Applicant: Mitsubishi Electric Corporation, Tokyo (JP)

(72) Inventors: Takeshi Kikuchi, Tokyo (JP); Fuminori Nakamura, Tokyo (JP); Ryosuke Uda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 168 days.

(21) Appl. No.: 18/251,194

(22) PCT Filed: Nov. 11, 2020

(86) PCT No.: PCT/JP2020/042130
§ 371 (c)(1),
(2) Date: Apr. 28, 2023

(87) PCT Pub. No.: WO2022/102028
PCT Pub. Date: May 19, 2022

(65) Prior Publication Data
US 2023/0378886 A1 Nov. 23, 2023

(51) Int. Cl.
*H02J 3/36* (2006.01)
*H02M 7/483* (2007.01)
*H02M 7/757* (2006.01)

(52) U.S. Cl.
CPC .............. *H02J 3/36* (2013.01); *H02M 7/4835* (2021.05); *H02M 7/7575* (2013.01)

(58) Field of Classification Search
CPC ......... H02J 3/36; Y02E 60/60; H02M 7/4835; H02M 7/7575
See application file for complete search history.

(56) References Cited

U.S. PATENT DOCUMENTS

2017/0331390 A1* 11/2017 Xu ............................ H02J 3/36
2018/0097450 A1* 4/2018 Andersson .............. H02M 7/25
(Continued)

FOREIGN PATENT DOCUMENTS

JP 2017011992 A 1/2017
JP 2018078733 A 5/2018

OTHER PUBLICATIONS

International Search Report (PCT/ISA/210) with English translation and Written Opinion (PCT/ISA/237) mailed on Jan. 26, 2021, by the Japan Patent Office as the International Searching Authority for International Application No. PCT/JP2020/042130. (8 pages).
(Continued)

*Primary Examiner* — Fred E Finch, III
(74) *Attorney, Agent, or Firm* — Buchanan Ingersoll & Rooney PC

(57) ABSTRACT

In a power conversion system, a first power converter is connected between a first AC power system, and a first DC main line and a DC return line. A second power converter is connected between the first AC power system, and the DC return line and a second DC main line. A first control device controls the first power converter in accordance with a first active power command value. A second control device controls the second power converter in accordance with a second active power command value. A common control device sets the first active power command value and the second active power command value by distributing a command value of total active power output from the entire power conversion system to the first AC power system. The common control device makes the first active power command value and the second active power command value different from each other.

5 Claims, 16 Drawing Sheets

(56) References Cited

U.S. PATENT DOCUMENTS

| | | | |
|---|---|---|---|
| 2019/0081551 A1* | 3/2019 | Hu .......................... | H02J 3/18 |
| 2020/0251906 A1 | 8/2020 | Jiang-häfner et al. | |
| 2021/0036634 A1* | 2/2021 | Messner ................. | H02J 3/36 |
| 2021/0222673 A1* | 7/2021 | Wang ..................... | H02J 3/381 |
| 2022/0140607 A1* | 5/2022 | Liu .......................... | H02J 3/36 |
| | | | 363/35 |

OTHER PUBLICATIONS

International Search Report (PCT/ISA/210) with English translation and Written Opinion (PCT/ISA/237) mailed on Jan. 19, 2021, by the Japanese Patent Office as the International Searching Authority for International Application No. PCT/JP2020/042129. (12 pages).
Extended European Search Report dated Oct. 7, 2024, issued in the corresponding European Patent Application No. 20961556.6, 15 pages.

\* cited by examiner (A)　　　　　　　　　　(B)

FIG.6
(A)
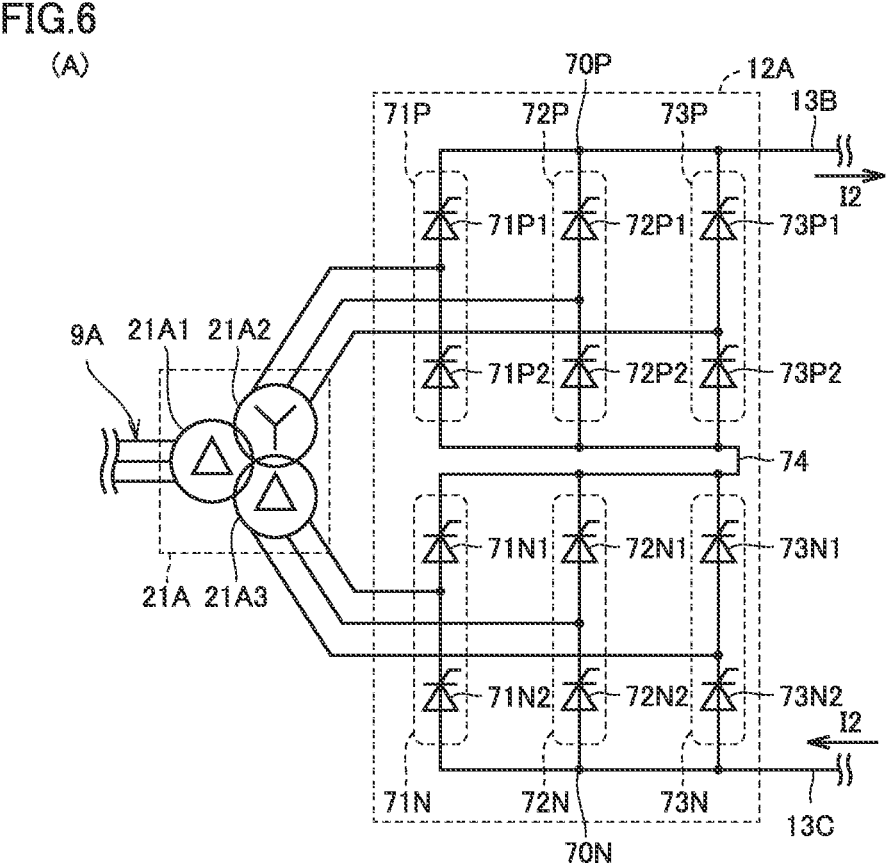
(B)
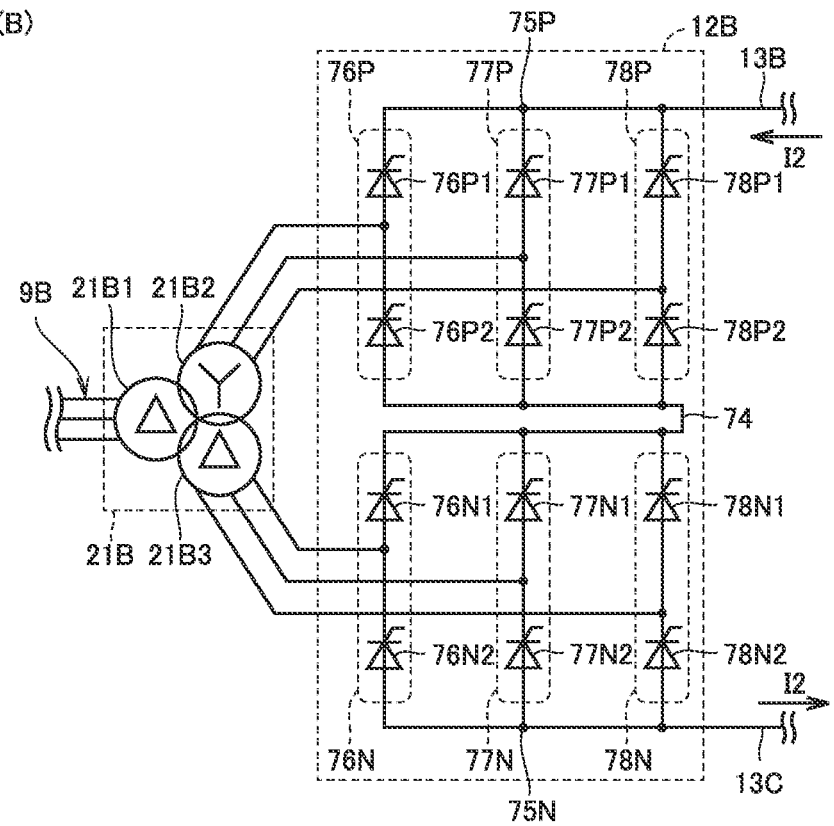

POWER CONVERSION SYSTEM AND CONTROL DEVICE FOR SAME

TECHNICAL FIELD

The present disclosure relates to a power conversion system and a control device thereof.

BACKGROUND ART

A high voltage direct current (HVDC) system is sometimes operated in a bipolar HVDC configuration configured by connecting two HVDCs with a common DC return line to increase power transmission capacity.

In the bipolar HVDC, a facility used for a first-pole HVDC and a facility used for a second-pole HVDC are not necessarily matched with each other. For example, due to different installation timings of the facilities, sometimes the HVDC introduced first is configured by a separately-excited HVDC and the HVDC introduced next is configured by a self-excited HVDC (for example, see PTL 1 (Japanese Patent Laying-Open No. 2018-078733).

CITATION LIST

Patent Literature

PTL 1: Japanese Patent Laying-Open No. 2018-078733

SUMMARY OF INVENTION

Technical Problem

In a case of the hybrid bipolar HVDC as described above, because the first-pole HVDC and the second-pole HVDC have different functions and characteristics, it is desirable to perform the operation according to the difference. This problem is not limited to the HVDC, but is also applicable to other bipolar power conversion systems such as a back to back (BTB) bipolar power conversion system.

The present disclosure has been made in view of the above points, and an object of the present disclosure is to more appropriately operate a power conversion system according to a difference in a bipolar power conversion system in which functions and characteristics are different between a first-pole power converter and a second-pole power converter. An example is a case where the difference in function and characteristic between the first-pole power converter and the second-pole power converter is caused by the difference between the self-excited type and the separately-excited type. However, the present disclosure is not limited to this case.

Solution to Problem

A power conversion system according to one embodiment includes a first power converter, a second power converter, a first control device, a second control device, and a common control device. The first power converter is connected between a first AC power system, and a first DC main line and a DC return line. The second power converter is connected between the first AC power system, and the DC return line and a second DC main line. The first control device controls the first power converter in accordance with a first active power command value. The second control device controls the second power converter in accordance with a second active power command value. The common control device sets the first active power command value and the second active power command value by distributing a command value of total active power output from the entire power conversion system to the first AC power system. The common control device makes the first active power command value and the second active power command value different from each other.

Advantageous Effects of Invention

According to the above embodiment, by making the first active power command value and the second active power command value different from each other, in the bipolar power conversion system in which the first-pole power converter and the second-pole power converter have different functions and/or characteristics, the power conversion system can be more appropriately operated according to the difference.

BRIEF DESCRIPTION OF DRAWINGS

FIG. 6 is a view schematically illustrating an example of a hardware configuration of a separately-excited converter.

DESCRIPTION OF EMBODIMENTS

Hereinafter, embodiments will be described in detail with reference to the drawings. Like or corresponding parts are denoted by like reference signs, and a description thereof will not be repeated.

First Embodiment

[Overall Configuration of Bipolar Power Conversion System]

Figure 1:
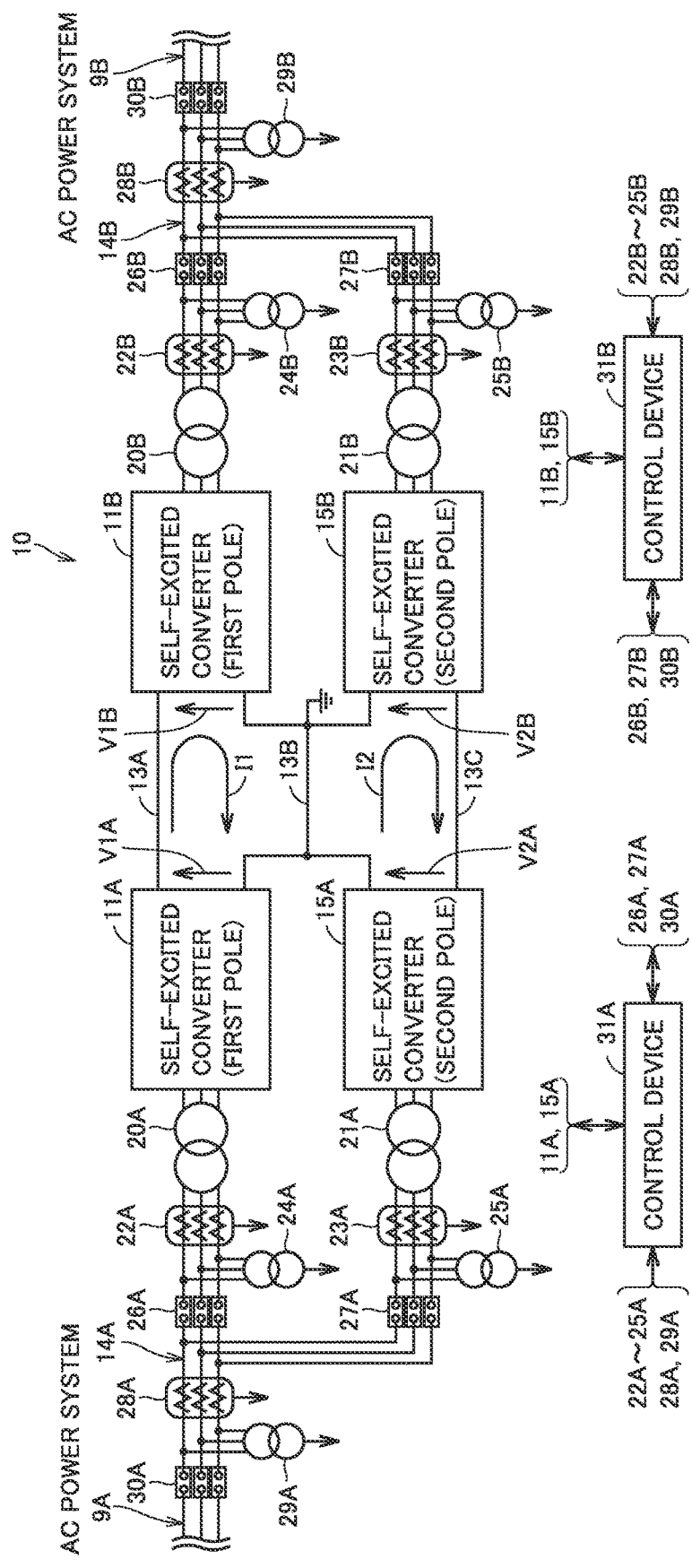
FIG. 1 is a circuit diagram illustrating a configuration example of a bipolar power conversion system.

FIG. 1 is a circuit diagram illustrating a configuration example of a bipolar power conversion system. With reference to FIG. 1, a bipolar power conversion system 10 includes first-pole power converters 11A, 11B, second-pole power converters 15A, 15B, and control devices 31A, 31B.

In FIG. 1, both first-pole power converters 11A, 11B and second-pole power converters 15A, 15B are configured by self-excited converters. In the present disclosure, first-pole power converter 11A provided on a side of an AC power system 9A is also referred to as a first power converter, and second-pole power converter 15A is also referred to as a second power converter. First-pole power converter 11B provided on the side of an AC power system 9B is also referred to as a third power converter, and the second-pole power converter 15B is also referred to as a fourth power converter.

First-pole power converter 11A is connected between an AC power system 9A and DC lines configured with a DC main line 13A and a DC return line 13B. First-pole power converter 11B is connected between the DC lines (DC main line 13A, DC return line 13B) and an AC power system 9B. In the present disclosure, AC power system 9A is also referred to as a first AC power system, and AC power system 9B is also referred to as a second AC power system.

Second-pole power converter 15A is connected between AC power system 9A and DC lines configured with a DC main line 13C and DC return line 13B. Second-pole power converter 15B is connected between the DC lines (DC main line 13C, DC return line 13B) and AC power system 9B. As described above, DC return line 13B is shared between the first-pole power converter and the second-pole power converter, so that current flowing through DC return line 13B can be reduced.

Specifically, the case where power converters 11A, 15A function as forward converters and power converters 11B, 15B function as inverse converters will be described. In this case, as illustrated in FIG. 1, a DC current I1 flows due to a potential difference between a DC voltage V1A output from power converter 11A and a DC voltage V1B output from power converter 11B. Furthermore, a DC current I2 flows due to a potential difference between a DC voltage V2A output from power converter 15A and a DC voltage V2B output from power converter 15B. DC current I1 and DC current I2 flowing through DC return line 13B are currents in opposite directions.

As illustrated in FIG. 1, bipolar power conversion system 10 further includes AC circuit breakers 30A, 26A, 27A, voltage transformers 29A, 24A, 25A, current transformers 28A, 22A, 23A, and transformers 20A, 21A.

AC circuit breaker 30A is provided on a three-phase line constituting AC power system 9A. AC circuit breaker 26A is connected between a branch point 14A of the three-phase line and first-pole power converter 11A. AC circuit breaker 27A is connected between branch point 14A and second-pole power converter 15A. AC circuit breaker 40A is used for separating a phase modifying facility 39A described later from AC power system 9A. Voltage transformer 29A and current transformer 28A are connected between AC circuit breaker 30A and branch point 14A. Voltage transformer 24A and current transformer 22A are connected between branch point 14A and first-pole power converter 11A. Voltage transformer 25A and current transformer 23A are connected between branch point 14A and second-pole power converter 15A.

Transformer 20A is connected between voltage transformer 24A and current transformer 22A, and first-pole power converter 11A. Transformer 21A is connected between voltage transformer 25A and current transformer 23A, and second-pole power converter 15A. An interconnection reactor may be used instead of transformers 20A, 21A.

Similarly to the above, bipolar power conversion system 10 further includes AC circuit breakers 30B, 26B, 27B, 40B, voltage transformers 29B, 24B, 25B, current transformers 28B, 22B, 23B, and transformers 20B, 21B. These dispositions on the side of AC power system 9B are similar to the dispositions on the side of AC power system 9A described above, and when A at the end of the reference numeral is replaced with B, the disposition is established as it is, and thus the description will not be repeated. In the following description, matters common to the device on the side of AC power system 9A and the device on the side of AC power system 9B will be described without adding A, B at the end of the reference signs.

Bipolar power conversion system 10 further includes control devices 31A, 31B. Control device 31A controls the operations of first-pole power converter 11A and second-pole power converter 15A based on current signals output from current transformers 22A, 23A, 28A and voltage signals output from voltage transformers 24A, 25A, 19A. Similarly, control device 31B controls the operations of first-pole power converter 11B and second-pole power converter 15B based on current signals output from current transformers 22B, 23B, 28B and voltage signals output from voltage transformers 24B, 25B, 19B. Further, control device 31A controls opening and closing of circuit breakers 30A, 26A, 27A, and control device 31B controls opening and closing of circuit breakers 30B, 26B, 27B.

Figure 2:
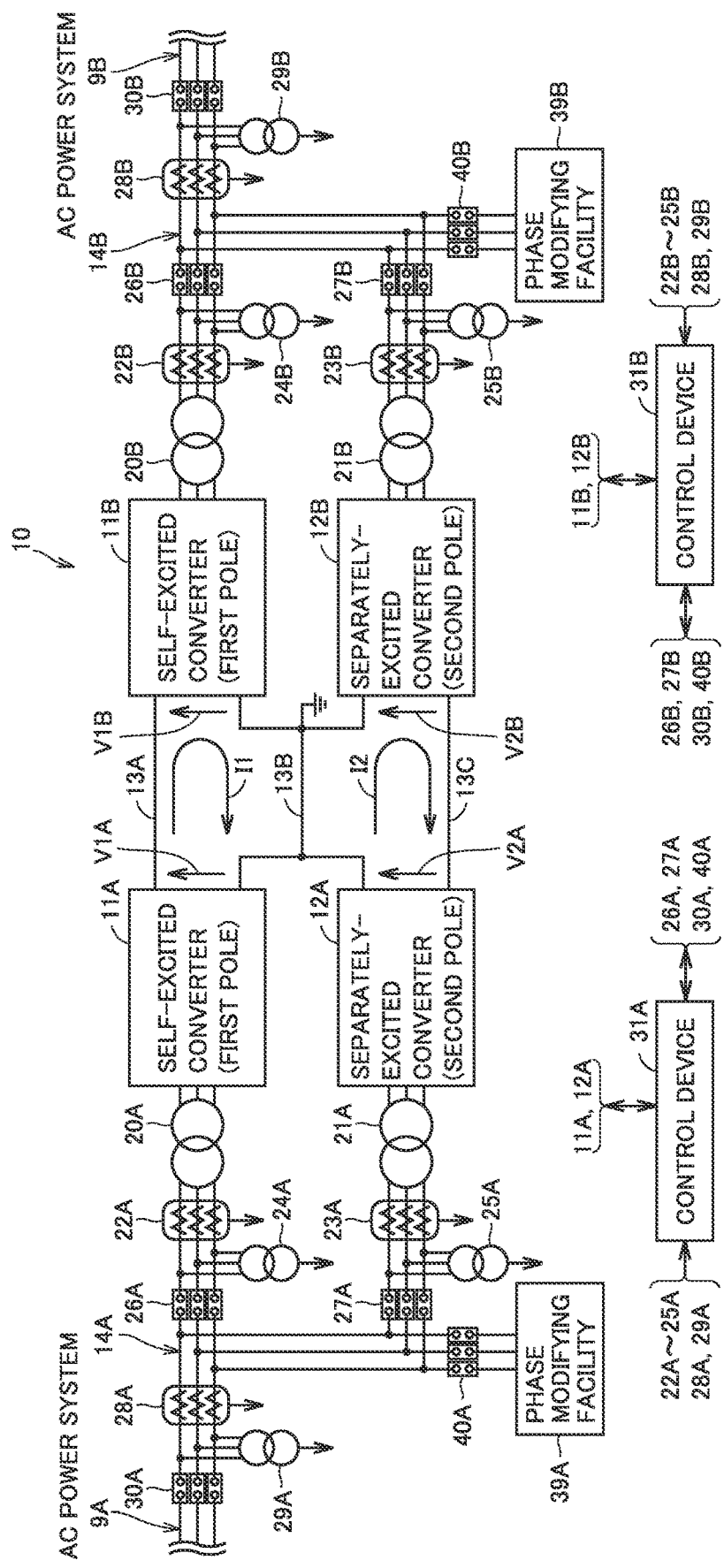
FIG. 2 is a circuit diagram illustrating another configuration example of the bipolar power conversion system.

FIG. 2 is a circuit diagram illustrating another configuration example of the bipolar power conversion system. Bipolar power conversion system 10 in FIG. 2 is different from bipolar power conversion system 10 in FIG. 1 in that second-pole power converters 12A, 12B are configured of separately-excited converters.

Furthermore, bipolar power conversion system 10 in FIG. 2 is different from bipolar power conversion system 10 in FIG. 1 in including phase modifying facilities 39A, 39B provided corresponding to second-pole power converters 12A, 12B and AC circuit breakers 40A, 40B.

As illustrated in FIG. 2, phase modifying facility 39A is connected to the AC power system 9A side of separately-excited power converter 12A, and phase modifying facility 39B is connected to the AC power system 9B side of separately-excited power converter 12B. AC circuit breaker 40A is provided to separate phase modifying facility 39A from AC power system 9A, and AC circuit breaker 40B is provided to separate phase modifying facility 39B from AC power system 9B. Specifically, phase modifying facility 39A is connected to branch point 14A of AC power system 9A with AC circuit breaker 40A interposed therebetween, and phase modifying facility 39B is connected to branch point 14A of AC power system 9B with AC circuit breaker 40B interposed therebetween. Control device 31A further controls the opening and closing operation of AC circuit breaker 40A, and control device 31B further controls the opening and closing operation of AC circuit breaker 40B.

The separately-excited converter is controlled so as to delay an ignition phase to obtain a desired voltage, so that a current phase is delayed with respect to a voltage phase. In order to compensate for the phase delay, phase modifying facilities 39A, 39B include static capacitors (also referred to as shunt capacitors).

Because other points in FIG. 2 are the same as those in FIG. 1, the same or corresponding parts are denoted by the same reference numerals, and the description thereof will not be repeated.

In bipolar power conversion system 10 of the first embodiment, unlike the cases in FIGS. 1 and 2, both the first-pole power converter and the second-pole power converter may be separately-excited converters. In this case, as illustrated in FIG. 2, phase modifying facility 39A is provided for both the first-pole and second-pole power converters connected to AC power system 9A, and phase modifying facility 39B is provided for both the first-pole and second-pole power converters connected to AC power system 9B.

[Functional Configuration of Control Device]

Figure 3:
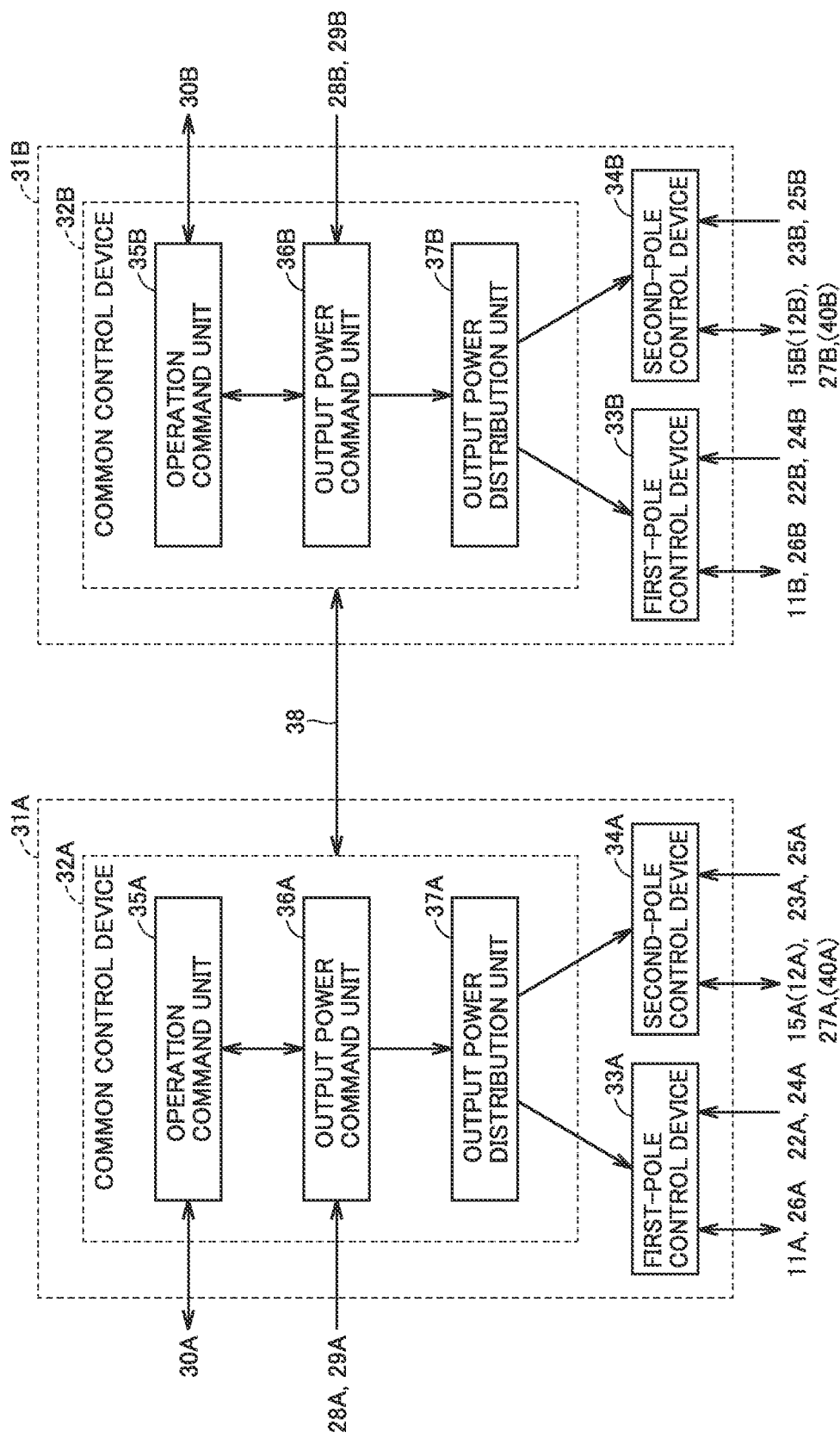
FIG. 3 is a block diagram illustrating a functional configuration of a control device in FIG. 1.

FIG. 3 is a block diagram illustrating a functional configuration of the control device in FIG. 1. FIG. 3 illustrates an example in which bipolar power conversion system 10 is an HVDC system.

With reference to FIG. 3, control device 31A includes a common control device 32A, a first-pole control device 33A, and a second-pole control device 34A. A common control device 32A includes an operation command unit 35A, an output power command unit 36A, and an output power distribution unit 37A. In the present disclosure, first-pole control device 33A is also referred to as a first control device, and second-pole control device 34A is also referred to as a second control device.

Similarly, control device 31B includes a common control device 32B, a first-pole control device 33B, and a second-pole control device 34B. Common control device 32B includes an operation command unit 35B, an output power command unit 36B, and an output power distribution unit 37B. Common control device 32A and common control device 32B exchange information with each other through a communication line 38.

Specifically, operation command unit 35A commands first-pole control device 33A to start and stop the operation of first-pole power converter 11A, and commands second-pole control device 34A to start and stop the operation of second-pole power converter 12A. Furthermore, operation command unit 35A controls opening and closing of AC circuit breaker 30A.

Output power command unit 36A generates a command value PrefA of active power and a command value QrefA of reactive power that are output from entire bipolar power conversion system 10 to AC power system 9A based on the detection values of current transformer 28A and voltage transformer 29A. Output power distribution unit 37A distributes each of active power command value PrefA and reactive power command value QrefA to the first-pole power converter and the second-pole power converter. Because there is the difference in function and/or characteristic between the first-pole power converter and the second-pole power converter, it is not always appropriate that active power command value PrefA and reactive power command value QrefB are equally distributed to the first-pole power converter and the second-pole power converter. In the present disclosure, active power command value PrefA is also referred to as a total active power command value, and reactive power command value QrefB is also referred to as a total reactive power command value.

First-pole control device 33A controls the operation of first-pole power converter 11A based on a first active power command value PrefA1 and a first reactive power command value QrefA1 that are received from common control device 32A, and also based on the detection values of current transformer 22A and voltage transformer 24A. Second-pole control device 34A controls the operation of second-pole power converter 12A based on a second active power command value PrefA2 and a second reactive power command value QrefA2 that are received from common control device 32A, and also based on the detection values of current transformer 23A and voltage transformer 25A. Furthermore, first-pole control device 33A controls the opening and closing operation of AC circuit breaker 26A, and second-pole control device 34A controls the opening and closing operation of AC circuit breaker 27A. In the case of bipolar power conversion system 10 in FIG. 2, second-pole control device 34A controls the opening and closing operation of AC circuit breaker 40A.

Functions of control device 31B controlling first-pole power converter 11B and second-pole power converter 12B are similar to those described above, and in the above description, "A" at the end of the reference numeral may be replaced with "B", and thus the description will not be repeated. Hereinafter, in the case where the function common between first-pole power converters 11A, 11B is described, it is simply referred to as first-pole power converter 11. Similarly, in the case where the function common to second-pole power converters 12A, 12B (15A, 15B) is described, it is simply referred to as second-pole power converter 12 (15).

When bipolar power conversion system 10 is a BTB system, common control device 32A and common control device 32B may be provided in common.

[Hardware Configuration Example of Self-Excited Converter]

Figure 4:
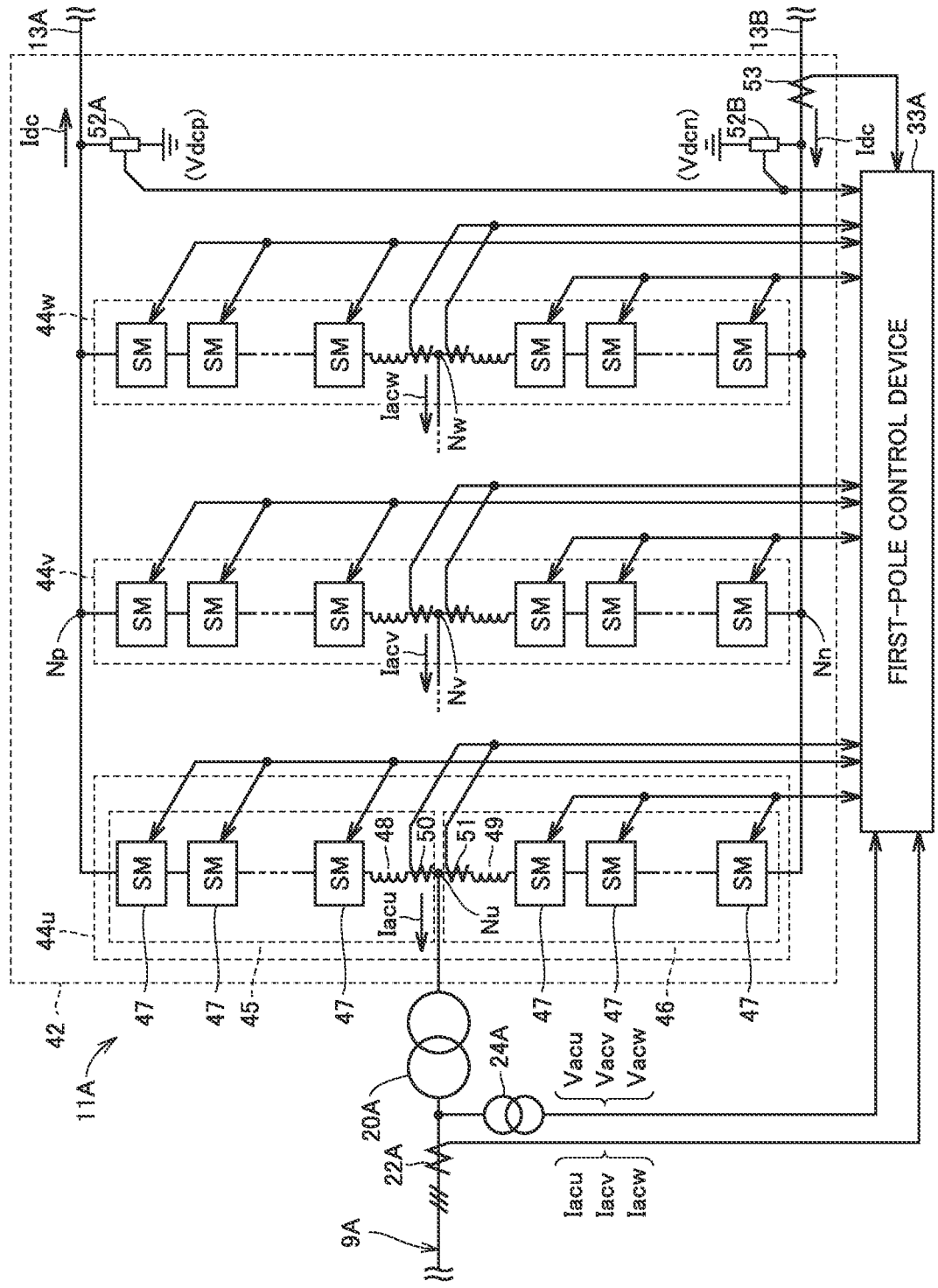
FIG. 4 is a view illustrating an example of a schematic hardware configuration of a self-excited converter in FIG. 1.

FIG. 4 is a view illustrating an example of a schematic hardware configuration of the self-excited converter in FIG. 1. FIG. 4 illustrates a configuration example of power converter 11A, and the configuration of power converter 11B is similar.

With reference to FIG. 4, power converter 11A is configured of a modular multilevel converter including a plurality of converter cells 47 connected in series to each other. The "converter cell" is also referred to as a "sub-module" or a "unit converter". Power converter 11A performs power conversion between the DC lines (DC main line 13A, DC return line 13B) and AC power system 9A.

Power converter 11A includes a plurality of leg circuits 44u, 44v, 44w (also referred to as "leg circuit 44" in the case where the leg circuits are collectively called or in the case where an arbitrary leg circuit is indicated) connected in parallel to each other between a positive electrode DC terminal (that is, a high potential-side DC terminal) Np and a negative electrode DC terminal (that is, a low potential-side DC terminal) Nn.

Leg circuit 44 is provided in each of a plurality of phases constituting the alternating current. Leg circuit 44 is connected between AC power system 9A and DC lines 13A, 13B, and performs the power conversion between both circuits. In FIG. 4, three leg circuits 44u, 44v, 44w are provided corresponding to a U phase, a V phase, a W phase, respectively.

AC input terminals Nu, Nv, Nw provided in leg circuits 44u, 44v, 44w are connected to AC power system 9A with transformer 20A interposed therebetween. In FIG. 4, the connection between AC input terminals Nv, Nw and transformer 20A is not illustrated for ease of illustration.

High potential-side DC terminal Np and low potential-side DC terminal Nn that are commonly connected to each leg circuit 44 are connected to DC main line 13A and DC return line 13B, respectively.

A primary winding may be provided in each of leg circuits 44u, 44v, 44w instead of AC input terminals Nu, Nv, Nw in FIG. 4, and leg circuits 44u, 44v, 44w may be connected to transformer 20A or the interconnection reactor in terms of AC through a secondary winding magnetically coupled to the primary winding. In this case, the primary winding may be set to following reactors 48A, 48B.

Leg circuit 44u includes an upper arm 45 from high potential-side DC terminal Np to AC input terminal Nu and a lower arm 46 from low potential-side DC terminal Nn to AC input terminal Nu. AC input terminal Nu that is the connection point between upper arm 45 and lower arm 46 is connected to transformer 20A.

Hereinafter, leg circuit 44u will be described below as a representative because leg circuits 44v, 44w have the same configuration.

Upper arm 45 includes a plurality of converter cells 47 connected in cascade and a reactor 48. The plurality of converter cells 47 and reactor 48 are connected in series. Similarly, lower arm 46 includes the plurality of converter cells 47 connected in cascade and a reactor 49. The plurality of converter cells 47 and reactor 49 are connected in series. The current circulating in power converter 11A can be prevented by providing reactors 48, 49, and furthermore, a rapid increase in a fault current in the event of a fault in AC power system 9A, DC lines 13A, 13B, or the like can be prevented.

Power converter 11A further includes voltage transformer 24A, current transformer 22A, DC voltage detectors 52A, 52B, current transformers 50, 51 provided in each leg circuit 44, and DC current detector 53 as detectors that measure an electric quantity (for example, current and voltage) used for control. Signals detected by these detectors are input to first-pole control device 33A.

In FIG. 4, for ease of illustration, a signal line of the signal input from each detector to first-pole control device 33A and a signal line of the signal input and output between first-pole control device 33A and each converter cell 47 are partially collectively illustrated, but are actually provided for each detector and each converter cell 47. The signal line between each converter cell 47 and first-pole control device 33A may be provided separately for transmission and for reception. For example, the signal line is formed of an optical fiber.

Each detector will be specifically described below.

Voltage transformer 24A detects a U-phase AC voltage Vacu, a V-phase AC voltage Vacv, and a W-phase AC voltage Vacw of AC power system 9A. Current transformer 22A detects a U-phase AC current Iacu, a V-phase AC current Iacv, and a W-phase AC current Iacw of AC power system 9A.

DC voltage detector 52A detects a DC voltage Vdcp of high potential-side DC terminal Np connected to DC main line 13A. DC voltage detector 52B detects a DC voltage Vdcn of low potential-side DC terminal Nn connected to DC return line 13B. A difference between DC voltage Vdcp and DC voltage Vdcn is defined as a DC voltage Vdc. DC current detector 53 detects a DC current Idc (equal to DC current I1 in FIG. 1) flowing through high potential-side DC terminal Np or low potential-side DC terminal Nn.

Current transformers 50, 51 provided in U-phase leg circuit 44u detect an upper arm current Ipu flowing through upper arm 45 and a lower arm current Inu flowing through lower arm 46, respectively. Current transformers 50, 51 provided in V-phase leg circuit 44v detect an upper arm current Ipv and a lower arm current Inv, respectively. Current transformers 50, 51 provided in W-phase leg circuit 44w detect an upper arm current Ipw and a lower arm current Inw, respectively.

[Configuration Example of Converter Cell]

Figure 5:
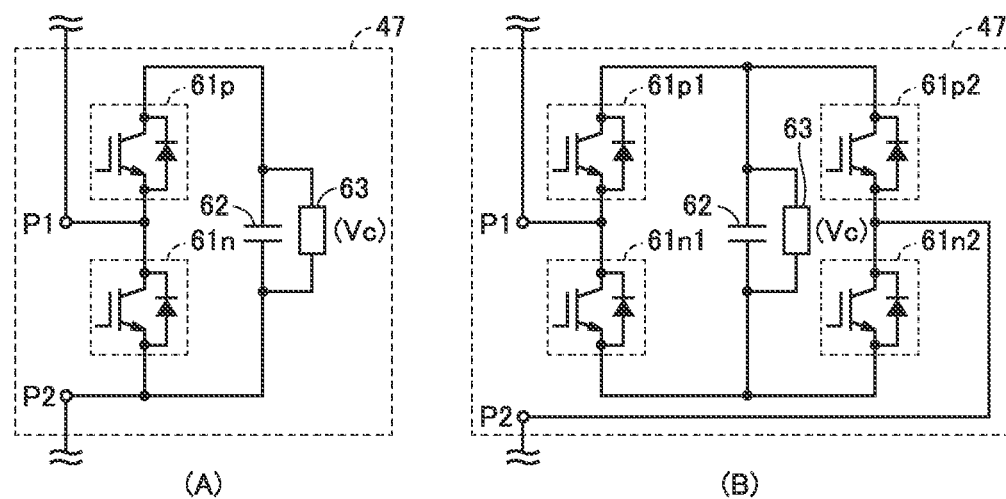
FIG. 5 is a circuit diagram illustrating a configuration example of a converter cell 47 constituting the self-excited power converter in FIG. 4.

FIG. 5 is a circuit diagram illustrating a configuration example of converter cell 47 constituting the self-excited power converter in FIG. 4.

Converter cell 47 in FIG. 5(A) has a circuit configuration called a half-bridge configuration. Converter cell 47 includes a series combination formed by connecting two switching elements 61p, 61n in series, an energy storage device 62, a voltage detector 63, and input and output terminals P1, P2. The series combination of switching elements 61p, 61n and energy storage device 62 are connected in parallel. Voltage detector 63 detects voltage Vc across energy storage device 62.

Both terminals of switching element 61n are connected to input and output terminals P1, P2, respectively. Converter cell 47 outputs voltage Vc of energy storage device 62 or zero voltage between input and output terminals P1, P2 by switching operation of switching elements 61p, 61n. When switching element 61p is turned on and switching element 61n is turned off, voltage Vc of energy storage device 62 is output from converter cell 47. When switching element 61p is turned off and switching element 61n is turned on, converter cell 47 output the zero voltage.

Converter cell 47 in FIG. 5(B) has a circuit configuration called a full-bridge configuration. Converter cell 47 includes a first series combination body formed by connecting two switching elements 61p1, 61n1 in series, a second series combination formed by connecting two switching elements 61p2, 61n2 in series, energy storage device 62, voltage detector 63, and input and output terminals P1, P2. The first series combination, the second series combination, and energy storage device 62 are connected in parallel. Voltage detector 63 detects voltage Vc across energy storage device 62.

A midpoint of switching element 61p1 and switching element 61n1 is connected to input and output terminal P1. Similarly, the midpoint of switching element 61p2 and switching element 61n2 is connected to input and output terminal P2. Converter cell 47 outputs voltage Vc, −Vc of energy storage device 62 or zero voltage between input and output terminals P1, P2 by switching operation of switching elements 61p1, 61n1, 61p2, 61n2.

In FIGS. 5(A) and 5(B), switching elements 61p, 61n, 61p1, 61n1, 61p2, 61n2 are configured by connecting a freewheeling diode (FWD) in antiparallel to a self-extinguishing semiconductor switching element such as an insulated gate bipolar transistor (IGBT) or a gate commutated turn-off (GCT) thyristor.

In FIGS. 5(A) and 5(B), a capacitor such as a film capacitor is mainly used as energy storage device 62. Energy storage device 62 may be referred to as a capacitor in the following description. Hereinafter, voltage Vc of energy storage device 62 is also referred to as a capacitor voltage Vc.

As illustrated in FIG. 4, converter cells 47 are connected in cascade. In each of FIGS. 5(A) and 5(B), in converter cell 47 disposed in upper arm 45, input and output terminal P1 is connected to input and output terminal P2 of adjacent converter cell 47 or high potential-side DC terminal Np, and input and output terminal P2 is connected to input and output terminal P1 of adjacent converter cell 47 or AC input terminal Nu. Similarly, in converter cell 47 disposed in lower arm 46, input and output terminal P1 is connected to input and output terminal P2 of adjacent converter cell 47 or AC input terminal Nu, and input and output terminal P2 is connected to input and output terminal P1 of adjacent converter cell 47 or low potential-side DC terminal Nn.

A converter cell other than the configuration described above, for example, a converter cell to which a circuit configuration called a clamped double cell or the like is applied may be used, and the switching element and the energy storage device are not limited to those described above.

[Hardware Configuration Example of Separately-Excited Converter]

FIG. 6 is a view schematically illustrating an example of a hardware configuration of the separately-excited converter. FIG. 6(A) illustrates a configuration example of power converter 12A in FIG. 1 used as the forward converter, and FIG. 6(B) illustrates a configuration example of power converter 12B in FIG. 1 used as the inverse converter. FIGS. 6(A) and 6(B) also illustrate configuration examples of transformers 21A, 21B.

With reference to FIG. 6(A), separately-excited power converter 12A includes thyristor units 71P, 72P, 73P connected in parallel to each other between DC return line 13B and connection point 74. Thyristor units 71P, 72P, 73P include a series circuit of thyristors 71P1, 71P2, a series circuit of thyristors 72P1, 72P2, and a series circuit of thyristors 73P1, 73P2, respectively.

Power converter 12A further includes thyristor units 71N, 72N, 73N connected in parallel to each other between connection point 74 and DC main line 13C. Thyristor units 71N, 72N, 73N include a series circuit of thyristors 71N1, 71N2, a series circuit of thyristors 72N1, 72N2, and a series circuit of thyristors 73N1, 73N2, respectively.

Each thyristor has a cathode on the side of DC return line 13B, and an anode on the side of DC main line 13C.

Transformer 21A includes a delta winding 21A1, a Y-winding 21A2, and a delta winding 21A3. Delta winding 21A1, Y-winding 21A2, and delta winding 21A3 are magnetically coupled to one another. Each of the u-phase, the v-phase, and the w-phase of AC power system 9A is connected to delta winding 21A1. The connection point between thyristors 71P1, 71P2, the connection point between thyristors 72P1, 72P2, and the connection point between thyristors 73P1, 73 P2 are connected to Y-winding 21A2. The connection point between thyristors 71N1, 71N2, the connection point between thyristors 72N1, 72N2, and the connection point between thyristors 73N1, 73N2 are connected to delta winding 21A3.

A circuit configuration of separately-excited power converter 12B used as the inverse converter is illustrated in FIG. 6(B). Power converter 12B in FIG. 6(B) is different from power converter 12A in FIG. 6(A) in that the anode of each thyristor is connected to the side of DC return line 13B and the cathode is connected to the side of DC main line 13C. Because other points of power converter 12B in FIG. 6(B) are similar to those in the case of FIG. 6(A), the corresponding components are denoted by the same reference numerals, and the description thereof will not be repeated.

Transformer 21B also includes a delta winding 21B1, a Y-winding 21B2, and a delta winding 21B3. Delta winding 21B1, Y-winding 21B2, and delta winding 21B3 in FIG. 6(B) correspond to delta winding 21A1, Y-winding 21A2, and delta winding 21A3 in FIG. 6(A), respectively. Because the connection between delta winding 21B1 and AC power system 9B and the connection between Y-winding 21B2 and each thysistor as well as delta winding 21B3 and each thyristor are the same as those in the case of FIG. 6(B), the description thereof will not be repeated.

[Functional Difference Between Self-Excited Converter and Separately-Excited Converter]

Hereinafter, as a premise of the present disclosure, a functional difference between the self-excited converter and the separately-excited converter will be described.

The self-excited converter is characterized in that the active power and the reactive power to be output can be independently controlled. This is because the self-excited converter can freely control a magnitude and a phase of an output voltage.

For example, in the case of the MMC described with reference to FIGS. 4 and 5, each of first-pole control device 33A and second-pole control device 34A calculates an active current value and a reactive current value from an actual measurement value of AC voltage of each phase and an actual measurement value of AC current of each phase. Each of first-pole control device 33A and second-pole control device 34A calculates an active voltage command value based on a deviation between an active current command value calculated from an active power command value and the above-described active current value (for example, by performing a proportional-integral operation on the deviation). Similarly, each of first-pole control device 33A and second-pole control device 34A calculates a reactive voltage command value based on a deviation between a reactive current command value calculated from a reactive power command value and the above-described reactive current value (for example, by performing a proportional-integral operation on the deviation). Subsequently, each of first-pole control device 33A and second-pole control device 34A performs two-phase/three-phase conversion on the calculated active voltage command value and reactive voltage command value to calculate an arm voltage command value of each phase. For example, the two-phase/three-phase conversion can be implemented by inverse Park conversion and inverse Clarke conversion. Alternatively, the two-phase/three-phase conversion can also be implemented by the inverse-Park conversion and space vector conversion. Each of first-pole control device 33A and second-pole control device 34A controls output of converter cells 47 provided in each phase arm based on the calculated arm voltage command value of each phase.

On the other hand, although separately-excited converter can control active power, a value of output reactive power is determined according to the active power. As described above, because the separately-excited converter is controlled so as to delay an ignition phase to obtain a desired voltage, a magnitude of an output voltage can be freely controlled, but a phase of the output voltage cannot be freely controlled. Specifically, a current phase is delayed with respect to a voltage phase. Accordingly, the separately-excited converter outputs inductive reactive power having a magnitude corresponding to a magnitude of an active power.

[Hardware Configuration Examples of Common Control Device, First-Pole Control Device, and Second-Pole Control Device]

Figure 7:
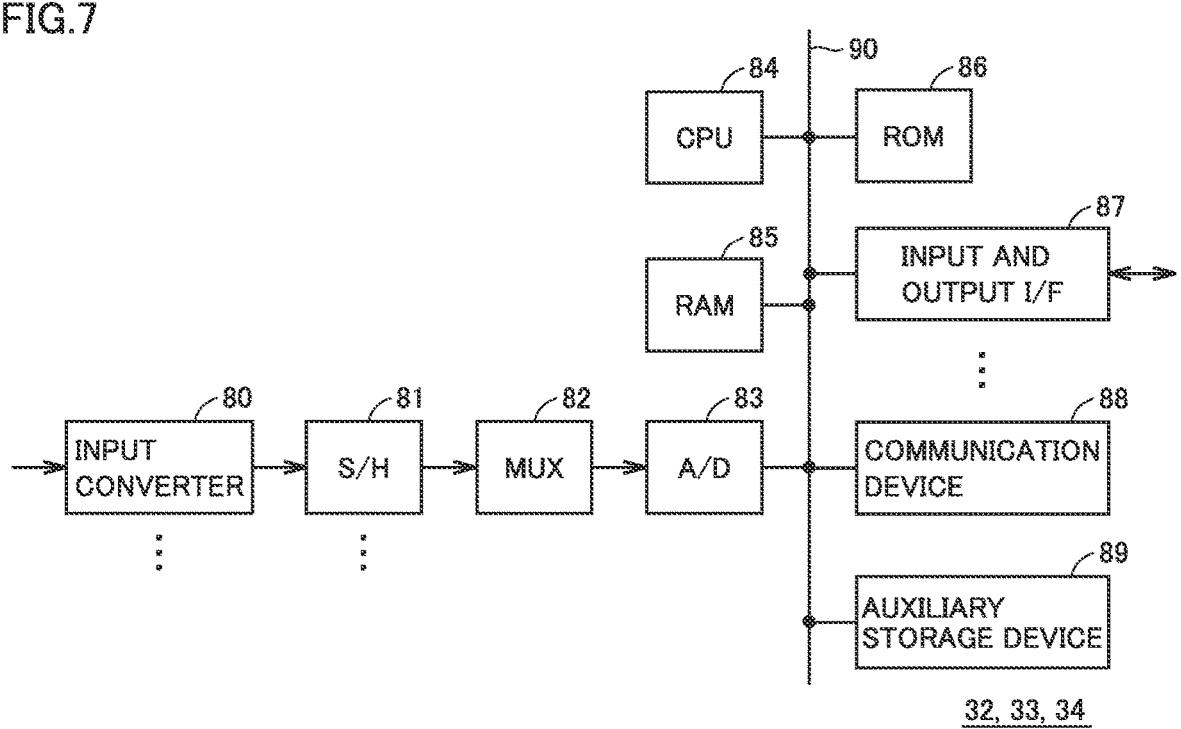
FIG. 7 is a block diagram illustrating hardware configuration examples of a common control device, a first-pole control device, and a second-pole control device in FIG. 3.

FIG. 7 is a block diagram illustrating hardware configuration examples of the common control device, the first-pole control device, and the second-pole control device in FIG. 3. FIG. 7 illustrates an example in which each control device is configured by a computer.

With reference to FIG. 7, each control device includes at least one input converter 80, at least one sample hold (S/H) circuit 81, a multiplexer (MUX) 82, and an analog to digital (A/D) converter 83. Each control device further includes at least one central processing unit (CPU) 84, a random access memory (RAM) 85, and a read only memory (ROM) 86. Furthermore, each control device includes at least one input and output interface 87 and an auxiliary storage device 89. In particular, common control device 32 includes a communication device 88 performing communication (that is, transmission and reception of information) through communication line 38 in FIG. 3. Each control device further includes a bus 90 that interconnects the above-described components.

Input converter 80 includes an auxiliary transformer (not illustrated) for each input channel. Each auxiliary transformer converts a detection signal by each current transformer and voltage transformer in FIG. 1 into a signal of a voltage level suitable for subsequent signal processing.

Sample hold circuit 81 is provided for each input converter 80. Sample hold circuit 81 samples and holds a signal representing the electric quantity received from corresponding input converter 80 at a specified sampling frequency.

Multiplexer 82 sequentially selects the signals held in the plurality of sample hold circuits 81. A/D converter 83 converts the signal selected by multiplexer 82 into a digital value. A/D conversion may be executed in parallel for detection signals of a plurality of input channels by providing a plurality of A/D converters 83.

CPU 84 controls the entire control device and executes arithmetic processing in accordance with a program. RAM 85 as a volatile memory and ROM 86 as a nonvolatile memory are used as main storage of CPU 84. ROM 86 stores a program, a setting value for signal processing, and the like. Auxiliary storage device 89 is a nonvolatile memory having a larger capacity than ROM 86, and stores a program, data of an electric quantity detection value, and the like.

Input and output interface 87 is an interface circuit for communication between CPU 84 and an external device.

Unlike the example in FIG. 7, at least a part of each control device can be configured using a circuit such as a field programmable gate array (FPGA) or an application specific integrated circuit (ASIC). That is, the function of each functional block in FIG. 4 can be configured on a basis of the computer in FIG. 7, or at least a part thereof can be configured using the circuit such as the FPGA and the ASIC. In addition, at least a part of the function of each functional block can be configured by an analog circuit.

[Control Operation of Bipolar Power Conversion System]

A control operation of bipolar power conversion system 10 of the first embodiment will be described below. Specifically, control device 31A controls each power converter so as to make active power PrA1 output from first-pole power converter 11A to AC power system 9A different from active power PrA2 output from second-pole power converter 12A or 15A to AC power system 9A. Specifically, control device 31B controls each power converter so as to make active power PrB1 output from first-pole power converter 11B to AC power system 9B different from active power PrB2 output from second-pole power converter 12B or 15B to AC power system 9B. PrA1 is equal to −PrB1, and PrA2 is equal to −PrB2.

Figure 8:
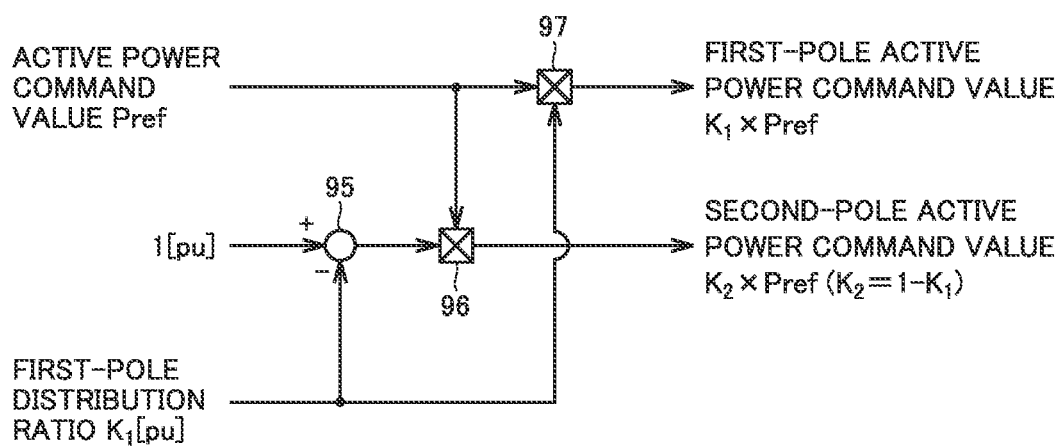
FIG. 8 is a view illustrating a function of an output power distribution unit in FIG. 3.

FIG. 8 is a view illustrating a function of the output power distribution unit in FIG. 3. With reference to FIG. 8, output power distribution unit 37 (37A, 37B) in FIG. 3 functionally includes a subtractor 95 and multipliers 96, 97. A distribution ratio $K_1$ to the first-pole power converter is previously stored in a memory (for example, ROM 86 or auxiliary storage device 89 in FIG. 7) or calculated by CPU 84 in FIG. 7 according to a program.

As illustrated in FIG. 8, output power distribution unit 37 receives active power command value Pref from output power command unit 36. Output power distribution unit 37 multiplies active power command value Pref by distribution ratio $K_1$ using multiplier 97, and outputs a multiplication result $K_1 \times$Pref to first-pole control device 33 as the first-pole active power command value. First-pole control device 33 controls corresponding first-pole power converter 11 (11A, 11B) based on the received first-pole active power command value.

Furthermore, output power distribution unit 37 calculates a distribution ratio $K_2$ of the active power command value to second-pole power converter 12 or 15 by subtracting distribution ratio $K_1$ from 1 [pu] using subtractor 95. Output power distribution unit 37 multiplies active power command value Pref by distribution ratio $K_2$ using multiplier 96, and outputs a multiplication result $K_2 \times$Pref to second-pole control device 34 as the second-pole active power command value. Second-pole control device 34 controls corresponding second-pole power converter 12 or 15 based on the received second-pole active power command value.

Furthermore, in bipolar power conversion system 10 of the first embodiment, when a power loss of first-pole power converter 11 is different from a power loss of second-pole power converter 12 or 15, distribution ratio $K_1$ is determined such that the loss in the entire system is minimized. For example, when first-pole power converter 11 is the self-excited converter and when second-pole power converter 12 or 15 is the separately-excited converter, the first-pole self-commutated converter has a smaller loss, so that distribution ratio $K_1$ is set to be larger than distribution ratio $K_2$. In addition, even in the case where first-pole power converter 11 and second-pole power converter 12 or 15 have different power losses due to different manufacturers, the loss of the entire system can be minimized when distribution ratio $K_1$ is different from distribution ratio $K_2$. Hereinafter, a method for setting distribution ratio $K_1$ will be described more specifically.

A loss $P_{loss}$ of entire bipolar power conversion system 10 such as a bipolar HVDC system is expressed as a sum of a loss $P_{cnv}$ of the entire converters and a loss $P_{cable}$ of the overall DC lines.

$$P_{loss} = P_{cnv} + P_{cable} \tag{1}$$

The above-described loss $P_{cnv}$ of P the entire converters is expressed as the sum of a loss $P_{cnv1}$ of the first-pole converters and a loss $P_{cnv2}$ of P the second-pole converters.

$$P_{cnv} = P_{cnv1} + P_{cnv2} \tag{2}$$

Loss $P_{cnv1}$ of the first-pole converters is expressed as the sum of s loss $P_{cnv1REC}$ of the first-pole converter at a rectifier end and a loss $P_{cnv1INV}$ of the first-pole converter at an inverter end.

$$P_{cnv1} = P_{cnv1REC} + P_{cnv1INV} \tag{3}$$

Similarly, loss P $P_{cnv2}$ of the second-pole converters is expressed as the sum of a loss $P_{cnv2REC}$ of the second-pole converter at the rectifier end and a loss $P_{cnv2INV}$ of the second-pole converter at the inverter end.

$$P_{cnv2} = P_{cnv2REC} + P_{cnv2INV} \tag{4}$$

Here, a design value of the loss of the first-pole converter is $K_{cnv1}$, and a design value of the loss of the second-pole converter is $K_{cnv2}$. $K_{cnv1}$ and $K_{cnv2}$ represent a ratio [%] of the loss in the first-pole converter and the second-pole converter to the transmitted active power. The distribution ratio of the active power to the first-pole converter is $K_1$, and the distribution ratio of the active power to the second-pole converter is $K_2$. Here, $K_1+K_2=1$. The loss of each converter changes according to the distribution ratio of the active power.

Specifically, loss $P_{cnv1REC}$ of the first-pole converter at the rectifier end and loss $P_{cnv1INV}$ of the first-pole converter at the inverter end are expressed as follows.

$$P_{cnv1REC}=K_1/0.5 \times K_{cnv1} \quad (5)$$

$$P_{cnv1INV}=K_1/0.5 \times K_{cnv1} \quad (6)$$

Similarly, loss $P_{cnv2REC}$ of P the second-pole converter at the rectifier end and loss $P_{cnv2INV}$ of the second-pole converter at the inverter end are expressed as follows.

$$P_{cnv2REC}=K_2/0.5 \times K_{cnv2} \quad (7)$$

$$P_{cnv2INV}=K_2/0.5 \times K_{cnv2} \quad (8)$$

On the other hand, loss of $P_{cable}$ the entire DC lines in Equation (1) is calculated as the sum of a loss $P_{cable1}$ of the first-pole main line, a loss $P_{cable0}$ of the return line, and a loss $P_{cable2}$ of the second-pole main line.

$$P_{cable}=P_{cable1}+P_{cable0}+P_{cable2} \quad (9)$$

Here, the design value of the power transmission line loss is $K_{cable}$. $K_{cable}$ represents the ratio [%] of the loss on the DC lines to the transmitted active power. In addition, loss $P_{cable1}$ of the first main line, loss $P_{cable0}$ of the return line, and loss $P_{cable2}$ of the second main line change according to the distribution ratio of the active power. Specifically, when design value $K_{cable}$ of an the power transmission line loss and distribution ratios $K_1$, $K_2$ are expressed as power transmission line losses of the first-electrode main line, the return line, and the second-electrode main line, $$P_{cable1}=(K_1/0.5)^2 \times K_{cable} \quad (10)$$

$$P_{cable0}=((K_1-K_2)/0.5)^2 \times K_{cable} \quad (11)$$

$$P_{cable2}=(K_2/0.5)^2 \times K_{cable} \quad (12)$$

are obtained.

Accordingly, loss $P_{loss}$ of the entire system of Equation (1) can be calculated as follows by Equations (2) to (12).

$$p_{loss} = K_1/0.5 \times K_{cnv1} \times 2 + K_2/0.5 \times K_{cnv2} \times 2 + \quad (13)$$
$$(K_1/0.5)^2 \times K_{cable} + ((K_1-K_2)/0.5)^2 \times K_{cable} + (K_2/0.5)^2 \times K_{cable} =$$
$$4 \times [K_1 \times K_{cnv1} + K_2 \times K_{cnv2} + (K_1^2 + (K_1-K_2)^2 + K_2^2) \times K_{cable}]$$

From Equation (13), when loss $K_{cnv1}$ of the first-pole converters is smaller than loss $K_{cnv2}$ of the second-pole converters, loss of $P_{cnv}$ the entire converters becomes smaller as distribution ratio $K_1$ to first-pole-converters the becomes larger than distribution ratio $K_2$ to the second-pole converters. However, loss $P_{cable}$ of the entire DC lines is the smallest when distribution ratios $K_1$, $K_2$ are equal, and increases as the difference between distribution ratios $K_1$, $K_2$ increases. Accordingly, optimum distribution ratio $K_1$ at which loss $P_{loss}$ of the entire system is minimized exists.

More specifically, when $K_2$ is erased using the relational equation of $K_2=1-K_1$, Equation (13) becomes a quadratic function convex downward with respect to distribution ratio $K_1$. Accordingly, when distribution ratio $K_1$ is expressed by the following equation, $$K_1=(-K_{cnv1}+K_{cnv2}+6 \times K_{cable})/(12 \times K_{cable}) \quad (14)$$

loss $P_{loss}$ of the entire system expressed by Equation (13) has a minimum value.

Figure 9:
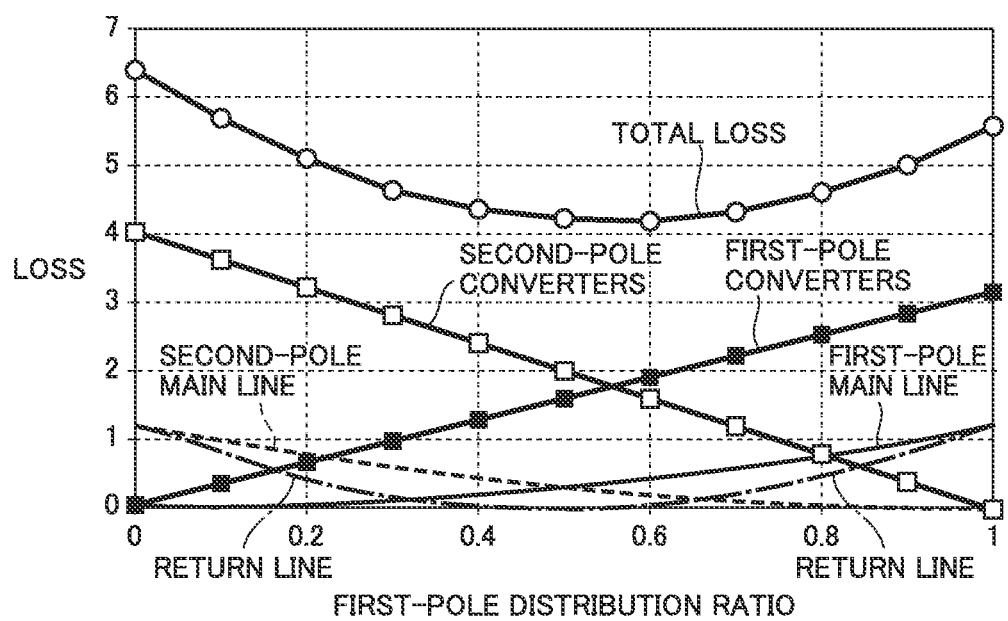
FIG. 9 is a view illustrating a calculation example of a total loss and a loss of each part of the bipolar power conversion system.

FIG. 9 is a view illustrating a calculation example of the total loss and the loss of each part of the bipolar power conversion system. In the example of FIG. 9, calculation results of the total loss and the loss of each part of the system are illustrated when design value $K_{cnv1}$ of the loss of the first-pole converters is set to 0.8%, when design value $K_{cnv2}$ of the loss of the second-pole converters is set to 1.0%, and when design value $K_{cable}$ of the power transmission line loss is set to 0.3%. Because design value $K_{cnv1}$ of the loss of the first-pole converters is smaller than design value $K_{cnv2}$ of the loss of the second-pole converters, the loss of the entire system can be minimized when distribution ratio $K_1$ is set to be larger than 0.5. Specifically, total loss $P_{loss}$ of bipolar power conversion system 10 can be minimized when distribution ratio $K_1$ is around 0.6.

Advantageous Effect of First Embodiment

According to bipolar power conversion system 10 of the first embodiment, when the functions and/or characteristics of first-pole power converter 11 and second-pole power converter 12 or 15 are different from each other, the active power command values for the first-pole power converter and the second-pole power converter are made different from each other according to the difference. Thus, bipolar power conversion system 10 can be more appropriately operated.

In particular, in bipolar power conversion system 10 of the first embodiment, when the power loss is different between first-pole power converter 11 and second-pole power converter 12 or 15, the distribution ratios $K_1$, $K_2$ of active power command value Pref are determined so as to minimize the power loss in the entire system.

In the above description, it is assumed that the ratio (% value) of the loss to the transmitted active power is constant. On the other hand, even when the ratio of the loss changes according to the active power and the reactive power output from each power converter, the loss in the entire system can be similarly reduced. In this case, output power distribution unit 37 determines distribution ratios $K_1$, $K_2$ so as to minimize the loss in the entire system according to active power command value Pref and reactive power command value Qref received from output power command unit 36.

Second Embodiment

In a second embodiment, as illustrated in FIG. 1, both first-pole power converters 11A, 11B and second-pole power converters 15A, 15B are self-excited converters, and both are MMC.

More specifically, the power is supplied from one of AC power systems 9A, 9B to the other when power interchange is required from one to the other, and bipolar power conversion system 10 operates without a load when the power interchange is not required. The second embodiment relates to this no-load operation. Because the functional configuration and the hardware configuration of bipolar power conversion system 10 are similar to those of the first embodiment, the description thereof will not be repeated.

Figure 10:
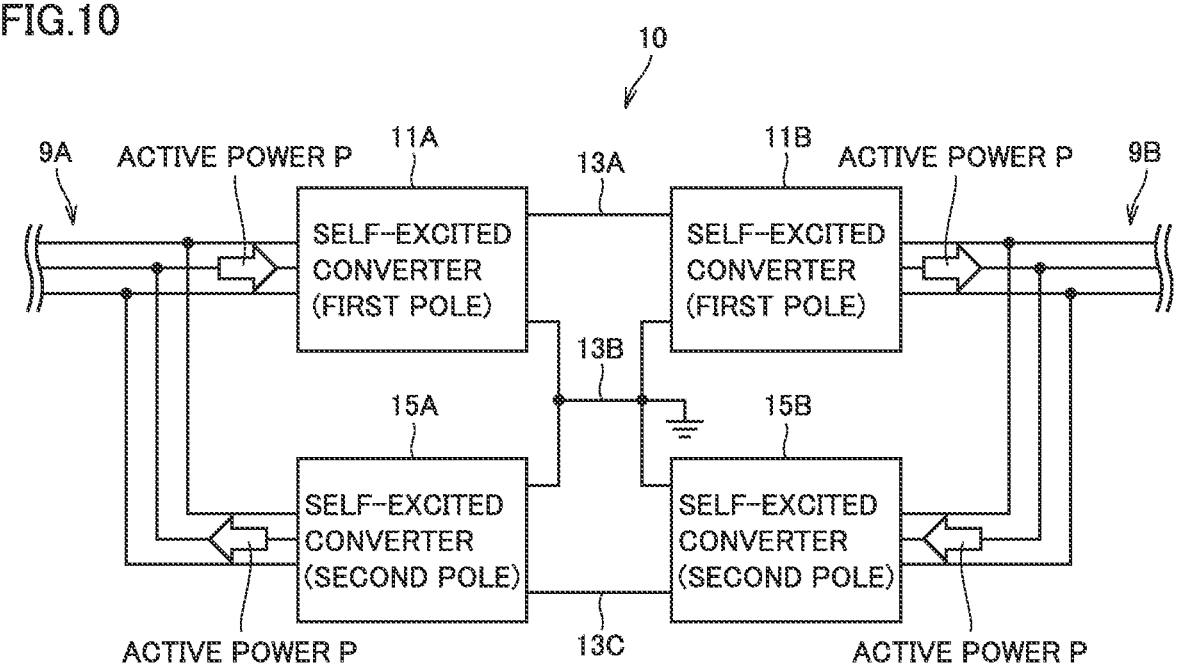
FIG. 10 is a view conceptually illustrating no-load operation in a bipolar power conversion system according to a second embodiment.

FIG. 10 is a view conceptually illustrating the no-load operation in the bipolar power conversion system of the second embodiment. Each of power converters 11A, 11B, 15A, 15B is a MMC-type self-excited converter.

With reference to FIG. 10, first-pole power converter 11A and second-pole power converter 15A function as forward converters, and first-pole power converter 11B and second-pole power converter 15B function as inverse converters. In this case, first-pole power converters 11A, 11B output positive (that is, in the direction from AC power system 9A to AC power system 9B) active power P. Second-pole power converters 15A, 15B output negative (that is, in the direction from AC power system 9B to AC power system 9A) active power P having the same magnitude as that of the first-pole power converters. The magnitude of active power P is about 10% of the rated value.

In the output distribution of the active power, the active power output by entire bipolar power conversion system 10 is zero. Accordingly, the no-load operation is implemented. However, the voltage at energy storage device 62 provided in each converter cell 47 can be controlled because the active current flows through each converter. Accordingly, the variation in the voltage at energy storage devices 62 of converter cells 47 constituting the MMC can be prevented even during the no-load operation.

Figure 11:
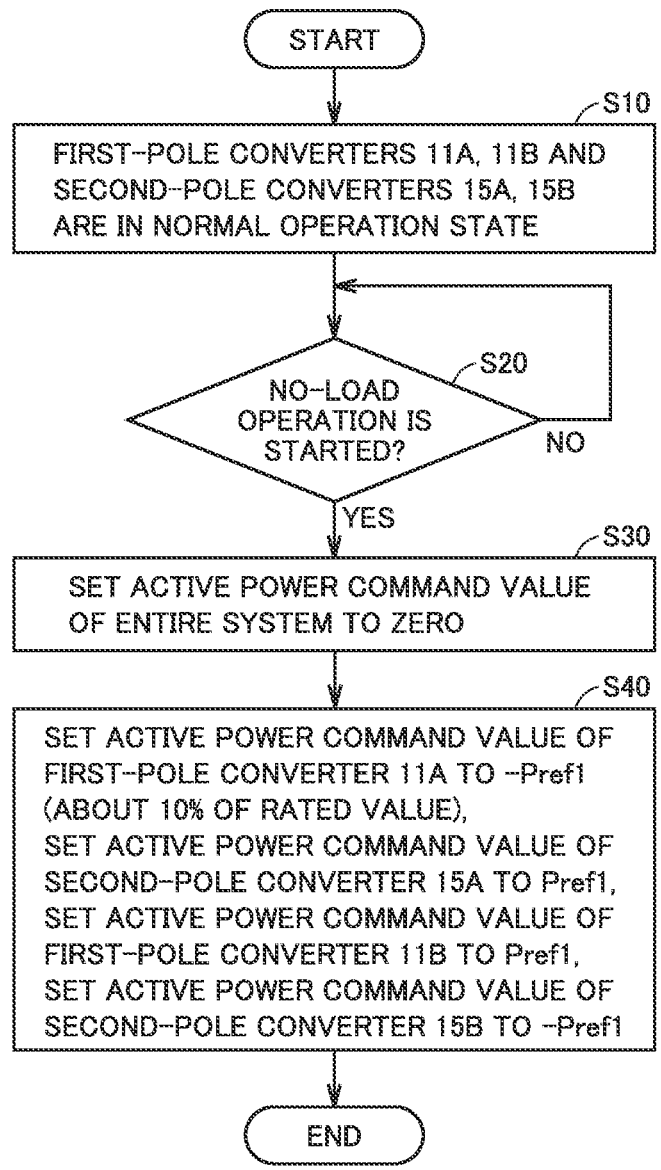
FIG. 11 is a flowchart illustrating operation of the common control device in FIG. 3 in the bipolar power conversion system of the second embodiment.

FIG. 11 is a flowchart illustrating operation of the common control device in FIG. 3 in the bipolar power conversion system of the second embodiment.

With reference to FIG. 11, in step S10, it is assumed that first-pole power converters 11A, 11B and second-pole power converters 15A, 15B are in a normal operation state. That is, the active power is supplied from one of AC power system 9A and AC power system 9B to the other in entire bipolar power conversion system 10.

In subsequent step S20, operation command unit 35 in FIG. 2 outputs the no-load operation command to output power command unit 36 when starting the no-load operation (YES in step S20).

In subsequent step S30, output power command unit 36 sets active power command value Pref for entire bipolar power conversion system 10 to zero.

In subsequent step S40, output power distribution unit 37A sets the active power command value of first-pole power converter 11A to −Pref1 (Pref1 is 10% of the rated value), and sets the active power command value of second-pole power converter 15A to Pref1. That is, the active power command values assigned to the first-pole and second-pole converters have the same magnitude, but have different signs. Similarly, output power distribution unit 37B sets the active power command value of first-pole power converter 11B to Pref1, and sets the active power command value of second-pole power converter 15B to −Pref1.

Third Embodiment

In the third embodiment, as illustrated in FIG. 2, first-pole power converters 11A, 11B are self-excited converters, and second-pole power converters 12A, 12B are separately-excited converters.

Figure 12:
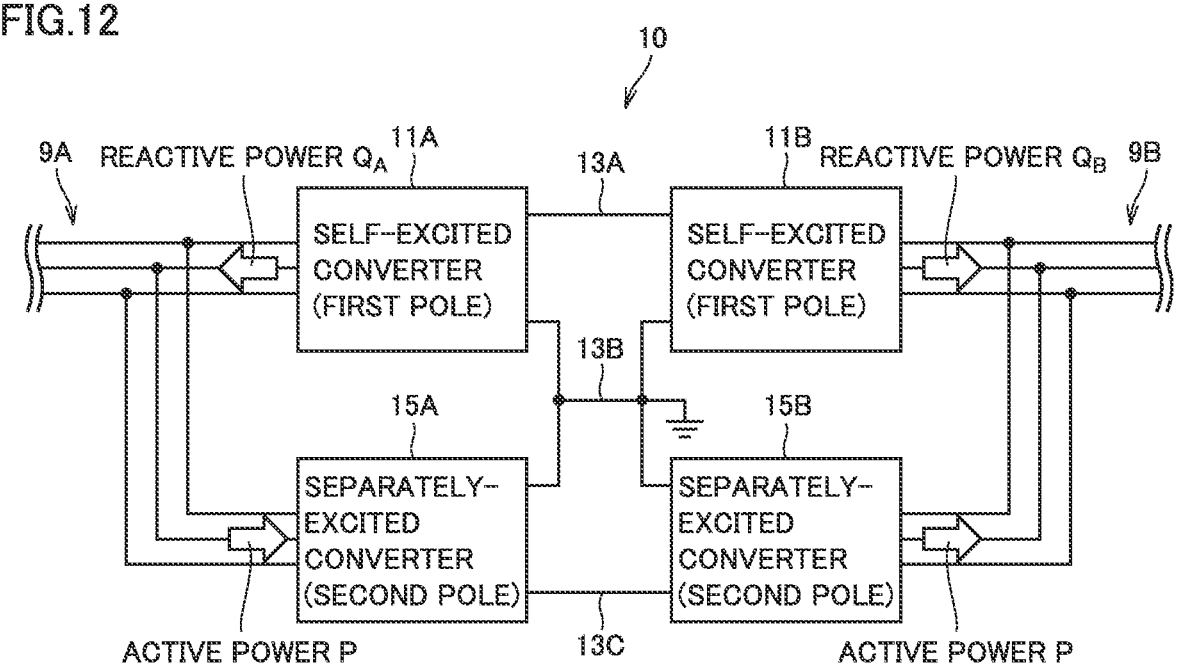
FIG. 12 is a view illustrating operation control of a bipolar power conversion system according to a third embodiment.

FIG. 12 is a view illustrating operation control of a bipolar power conversion system according to a third embodiment. In bipolar power conversion system 10 of the third embodiment, control devices 31A, 31B perform control such that self-excited power converters 11A, 11B exclusively output reactive power, and perform control such that separately-excited power converters 12A, 12B output required active power.

As a result, active power control and reactive power control are possible in the entire of bipolar power conversion system 10, and automatic voltage regulator (AC-AVR) control of AC power systems 9A, 9B is possible. Because active power is output exclusively from separately-excited power converters 12A, 12B, the fluctuation of the active power can be easily prevented. Furthermore, phase modifying facilities 39A, 39B in FIG. 2 can be made unnecessary by outputting the reactive power from self-excited power converters 11A, 11B so as to compensate for the reactive power output of separately-excited power converters 12A, 12B.

Because the functional configuration and the hardware configuration of bipolar power conversion system 10 are similar to those of the first embodiment, the description thereof will not be repeated.

Figure 13:
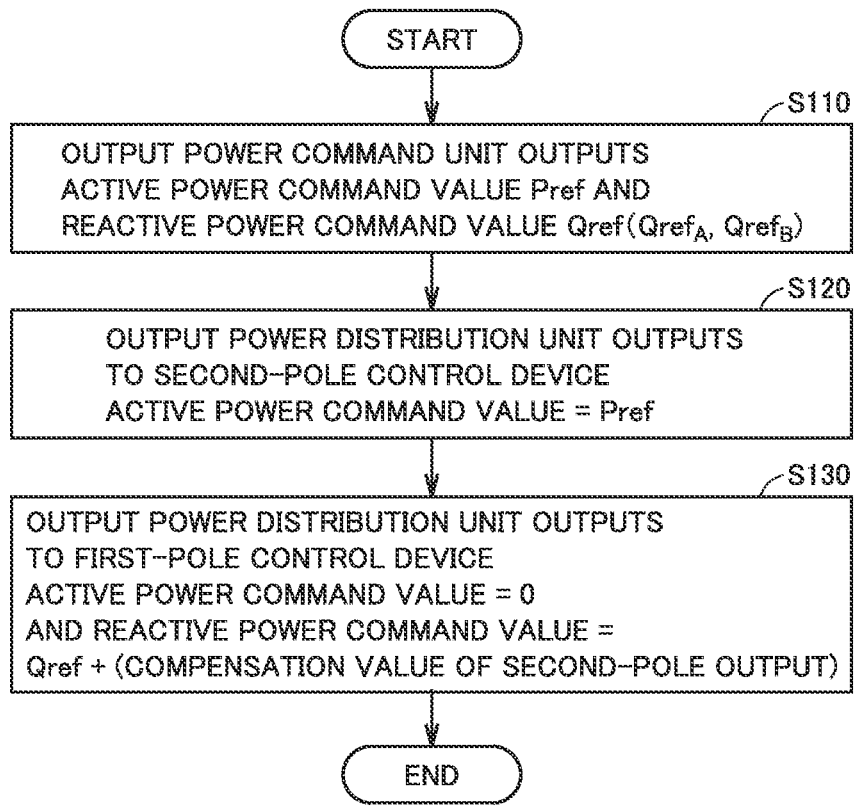
FIG. 13 is a flowchart illustrating the operation of the common control device in FIG. 3 in the bipolar power conversion system of the third embodiment.

FIG. 13 is a flowchart lustrating the operation of the common control device in FIG. 3 in the bipolar power conversion system of the third embodiment.

With reference to FIG. 13, in step S110, output power command unit 36 outputs active power command value Pref and reactive power command value Qref of entire bipolar power conversion system 10. In regards to reactive power command value Qref, a command value QrefA of reactive power output to AC power system 9A and a command value QrefB of reactive power output to AC power system 9B may be different from each other.

The following steps S110 and S120 may be executed in parallel, or either may be executed first. Specifically, in step S110, output power distribution unit 37 outputs active power command value Pref to second-pole control device 34 as an active power command value for separately-excited power converter 12.

In step S120, output power distribution unit 37 outputs zero to first-pole control device 33 as an active power command value for self-excited power converter 11, and outputs reactive power command value Qref to first-pole control device 33 as a reactive power command value for self-excited power converter 11. Output power distribution unit 37 may output a value obtained by adding a compensation value of the reactive power output of separately-excited power converter 12 to reactive power command value Qref as a reactive power command value for power converter 11.

Fourth Embodiment

As illustrated in FIG. 1, a fourth embodiment relates to the case where both first-pole power converters 11A, 11B and second-pole power converters 15A, 15B are self-excited converters and both of them are the MMC. In this case, a technique for reducing a switching loss in converter cells 47 as a whole will be described. The fourth embodiment can be combined with the first and second embodiments. Hereinafter, a more detailed configuration example of first-pole control device 33 and second-pole control device 34 will be described, and then features of the fourth embodiment will be described.

[Configuration Example of First-Pole (Second-Pole) Control Device]

Figure 14:
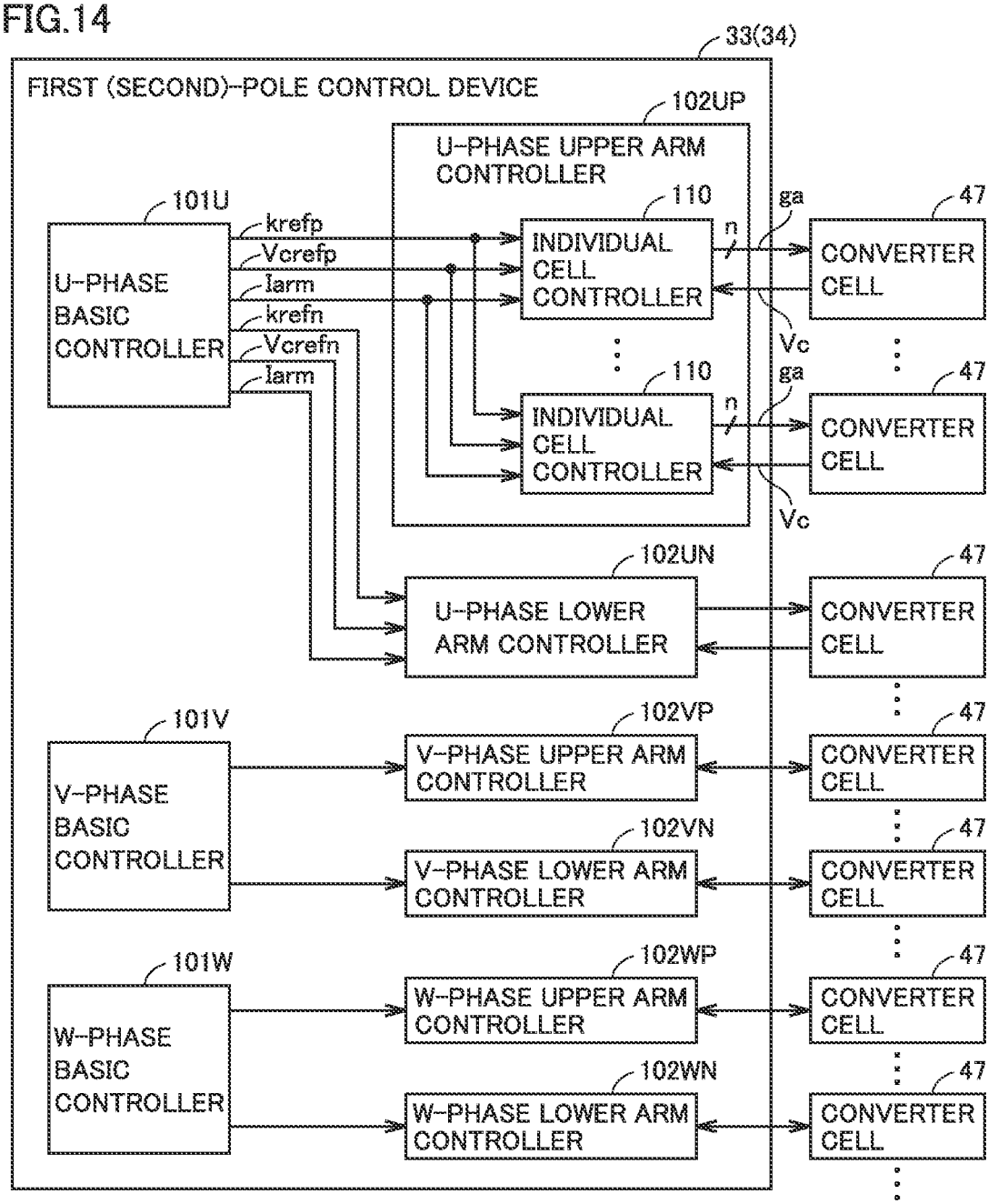
FIG. 14 is a functional block diagram illustrating a more detailed configuration of a first-pole control device 33 in FIGS. 3 and 4.

FIG. 14 is a functional block diagram illustrating the more detailed configuration of first-pole control device 33 in FIGS. 3 and 4. Second-pole control device 34 also has the same configuration as first-pole control device 33.

With reference to FIG. 14, first-pole control device 33 controls on and off of switching elements 61p, 61n of each converter cell 47. First-pole control device 33 includes a U-phase basic controller 101U, a U-phase upper arm controller 102UP, a U-phase lower arm controller 102UN, a V-phase basic controller 101V, a V-phase upper arm controller 102VP, a V-phase lower arm controller 102VN, a W-phase basic controller 101W, a W-phase upper arm controller 102WP, and a W-phase lower arm controller 102WN.

Hereinafter, U-phase basic controller 101U, U-phase upper arm controller 102UP, and U-phase lower arm controller 102UN will be described. The cases of the V-phase and the W-phase are similar to the case of the U-phase.

U-phase basic controller 101U generates a voltage command value krefp of the U-phase upper arm, a voltage command value krefn of the U-phase lower arm, a voltage command value Vcrefp of energy storage device 62 of the U-phase upper arm, and a voltage command value Vcrefn of energy storage device 62 of the U-phase lower arm based on detection values of a U-phase AC voltage Vacu, a U-phase AC current Iacu, a U-phase circulating current, a DC voltage Vdc, a DC current Idc, and a voltage of energy storage device 62 of each U-phase converter cell 47.

U-phase upper arm controller 102UP includes an individual cell controller 110 individually corresponding to converter cell 47 provided on the U-phase upper arm. Similarly, U-phase lower arm controller 102UN includes an individual cell controller 110 (not illustrated) individually corresponding to converter cell 47 provided in the U-phase lower arm.

Each individual cell controller 110 provided in U-phase upper arm controller 102UP receives, from U-phase basic controller 101U, voltage command value krefp of the U-phase upper arm, voltage command value Vcrefp of energy storage device 62 of the U-phase upper arm, and detection value Iarm of the arm current. Each individual cell controller 110 provided in U-phase lower arm controller 102UN receives, from U-phase basic controller 101U, voltage command value krefn of the U-phase lower arm, voltage command value Vcrefn of energy storage device 62 of the U-phase lower arm, and detection value Iarm of the arm current.

[Configuration Example of Individual Cell Controller]

Figure 15:
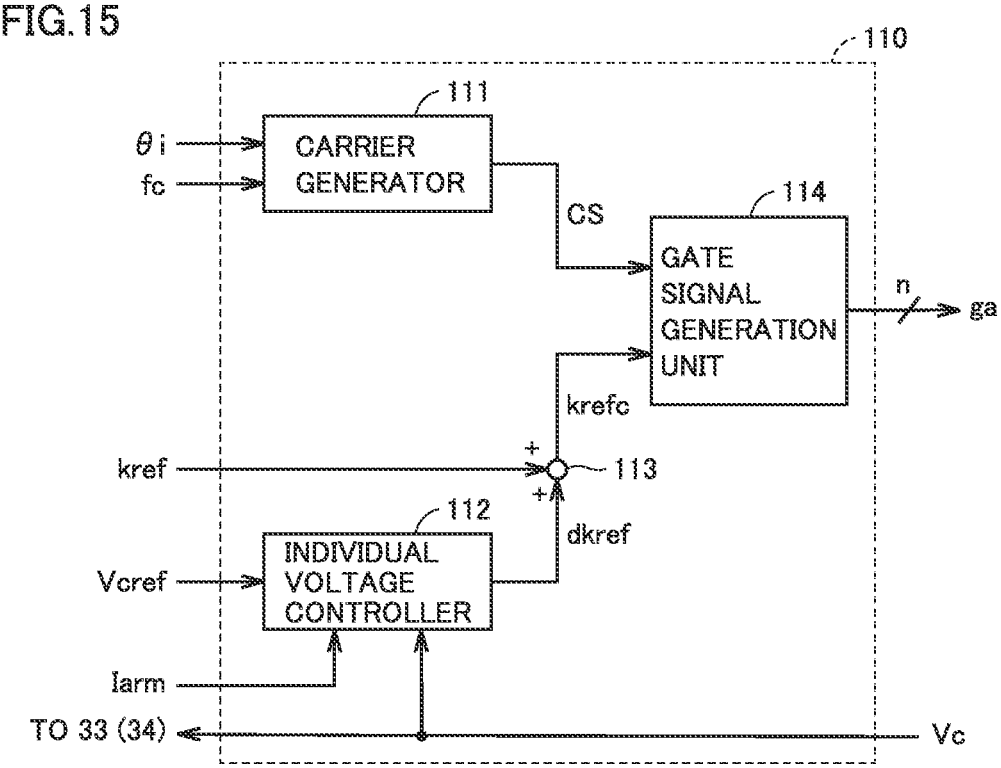
FIG. 15 is a block diagram illustrating a configuration example of an individual cell controller in FIG. 14.

FIG. 15 is a block diagram illustrating a configuration example of the individual cell controller in FIG. 14.

With reference to FIG. 15, individual cell controller 110 includes a carrier generator 111, an individual voltage controller 112, an adder 113, and a gate signal generation unit 114.

Carrier generator 111 generates a carrier signal CS having a predetermined frequency (that is, the carrier frequency) used in phase shift pulse width modulation (PWM) control. In the phase shift PWM control, timing of a PWM signal output to each of a plurality of (Ncell) converter cells 47 constituting the same arm (upper arm 45 or lower arm 46) is shifted from each other. As a result, it is known that a harmonic component included in the combined voltage of the output voltage of respective converter cells 47 is reduced.

Based on a reference phase θi and the carrier frequency fc that are received from common control device 32 in FIG. 3, carrier generator 111 generates carrier signal CS in which phases are shifted from each other among Ncell converter cells 47.

Individual voltage controller 112 receives voltage command value Vcref (Vcrefp or Vcrefn) of energy storage device 62, voltage Vc of energy storage device 62 of corresponding converter cell 47, and the detection value of arm current Iarm of the arm to which corresponding converter cell 47 belongs. Voltage command value Vcref of energy storage device 62 may be set to an average value of voltages Vc of energy storage devices 62 of the entire power converter, or set to an average value of energy storage devices 62 of Ncell converter cells 47 included in the same arm.

Individual voltage controller 112 calculates the deviation of voltage Vc of energy storage device 62 to voltage command value Vcref of energy storage device 62 to calculate a control output dkref for individual voltage control. Individual voltage controller 112 can be configured by a controller that executes PI control, PID control, or the like. Control output dkref for charging or discharging energy storage device 62 so as to eliminate the deviation is calculated by multiplying the arithmetic value by the controller by "+1" or "−1" according to the polarity of arm current Iarm. Alternatively, control output dkref for charging or discharging energy storage device 62 so as to eliminate the deviation may be calculated by multiplying the arithmetic value by the controller by arm current Iarm.

Adder 113 adds voltage command value kref (kerfp or krefn) from corresponding basic controller 101 (101U, 101V or 101W) and control output dkref of individual voltage controller 112 to output cell voltage command value krefc.

Gate signal generation unit 114 PWM-modulates cell voltage command value krefc with carrier signal CS from carrier generator 111 to generate gate signals ga of n switching elements 61 constituting corresponding converter cell 47.

[Configuration and Operation of Common Control Device]

Figure 16:
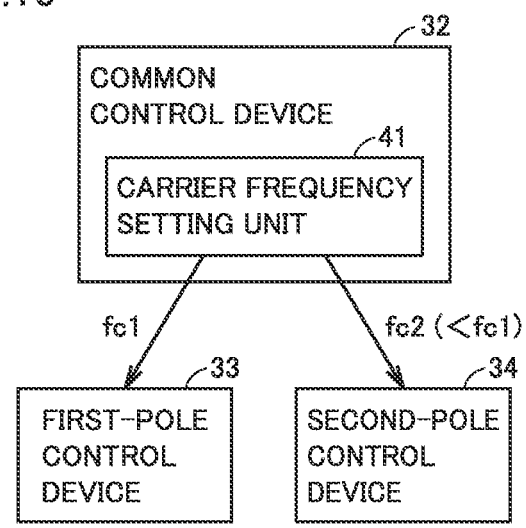
FIG. 16 is a block diagram illustrating a configuration and operation of a common control device in a bipolar power conversion system according to a fourth embodiment.

FIG. 16 is a block diagram illustrating the configuration and operation of the common control device in the bipolar power conversion system of the fourth embodiment.

With reference to FIG. 16, common control device 32 further includes a carrier frequency setting unit 41 setting a carrier frequency fc in addition to operation command unit 35, output power command unit 36, and output power distribution unit 37 that are described with reference to FIG. 3.

Carrier frequency setting unit 41 sets a set value fc2 of the carrier frequency output to second-pole control device 34 to be smaller than a set value fc1 of the carrier frequency output to first-pole control device 33 (this relationship may be reversed). As a result, the switching loss of each converter cell 47 of second-pole power converters 15A, 15B can be reduced, so that the loss can be reduced as the entire system of bipolar power conversion system 10. In addition, when a fault occurs in the power system, first-pole power converters 11A, 11B having a high carrier frequency can respond at high speed. As a result, the performance of bipolar power conversion system 10 can be improved as compared with the case where the switching frequencies of both first-pole power converters 11A, 11B and second-pole power converters 15A, 15B are set to be low.

Embodiments disclosed here should be understood as being illustrative rather than being limitative in all respects. The scope of the present application is shown not in the foregoing description but in the claims, and it is intended that all modifications that come within the meaning and range of equivalence to the claims are embraced here.

REFERENCE SIGNS LIST 9A, 9B: AC power system, 10: bipolar power conversion system, 11, 12, 15: power converter, 13A, 13C: DC main line, 13B: DC return line, 31: control device, 32: common control device, 33: first-pole control device, 34: second-pole control device, 35: operation command unit, 36: output power command unit, 37: output power distribution unit, 39: phase modifying facility, 41: carrier frequency setting unit, 45: upper arm, 46: lower arm, 47: converter cell, 61: switching element, 62: energy storage device

The invention claimed is:

1. A power conversion system comprising:
a first power converter connected between
a first AC power system, and
a first DC main line and a DC return line;
a second power converter connected between
the first AC power system, and
the DC return line and a second DC main line;
a third power converter connected between
a second AC power system, and
the first DC main line and the DC return line; and
a fourth power converter connected between
the second AC power system, and
the DC return line and the second DC main line;
a first control device to control the first power converter in accordance with a first active power command value;
a second control device to control the second power converter in accordance with a second active power command value; and
a common control device to set the first active power command value and the second active power command value by distributing a command value of total active power output from the entire power conversion system to the first AC power system, wherein
the common control device makes the first active power command value and the second active power command value different from each other, and
the common control device distributes the total active power command value to the first active power command value and the second active power command value such that a sum of losses at the first power converter, the second power converter, the third power converter, the fourth power converter, the first DC main line, the DC return line, and the second DC main line is minimized.

2. The power conversion system according to claim 1, wherein the common control device sets the first active power command value to be larger than the second active power command value when a loss of the first power converter is smaller than a loss of the second power converter and a loss of the third power converter is smaller than a loss of the fourth power converter.

3. The power conversion system according to claim 1, wherein
each of the first power converter and the second power converter is a modular multilevel converter including a plurality of cascade-connected converter cells,
each of the plurality of converter cells included in the first power converter includes a plurality of switching elements that are pulse-width controlled according to a first carrier frequency,
each of the plurality of converter cells included in the second power converter includes a plurality of switching elements that are pulse-width controlled according to a second carrier frequency, and
the common control device sets the second carrier frequency to be lower than the first carrier frequency.

4. A power conversion system comprising:
a first power converter connected between
a first AC power system, and
a first DC main line and a DC return line;
a second power converter connected between
the first AC power system, and
the DC return line and a second DC main line;
a first control device to control the first power converter in accordance with a first active power command value;
a second control device to control the second power converter in accordance with a second active power command value; and
a common control device to set the first active power command value and the second active power command value by distributing a command value of total active power output from the entire power conversion system to the first AC power system, wherein
the common control device makes the first active power command value and the second active power command value different from each other,
each of the first power converter and the second power converter is a modular multilevel converter, and
when the total active power command value is set to zero, the common control device sets magnitude of the first active power command value to be equal to magnitude of the second active power command value, and sets a sign of the first active power command value to be opposite to a sign of the second active power command value.

5. A power conversion system comprising:
a first power converter connected between
a first AC power system, and
a first DC main line and a DC return line; and
a second power converter connected between
the first AC power system, and
the DC return line and a second DC main line, wherein
each of the first power converter and the second power converter is a modular multilevel converter including a plurality of cascade-connected converter cells, and
each of the plurality of converter cells includes a plurality of switching elements,
the power conversion system further comprising:
a first control device to perform pulse-width control on the plurality of switching elements of each of the plurality of converter cells included in the first power converter according to a first carrier frequency; and
a second control device to perform the pulse-width control on the plurality of switching elements of each of the plurality of converter cells included in the second power converter according to a second carrier frequency smaller than the first carrier frequency.

\* \* \* \* \*